July 8, 1941.　　　H. M. STROBEL　　　2,248,727
SIGNALING SYSTEM
Filed Dec. 9, 1939　　　3 Sheets-Sheet 1

INVENTOR
HOWARD M. STROBEL
BY
Marshall & Hawley.
ATTORNEYS

July 8, 1941.　　　H. M. STROBEL　　　2,248,727
SIGNALING SYSTEM
Filed Dec. 9, 1939　　　3 Sheets-Sheet 2

INVENTOR
HOWARD M. STROBEL
BY
ATTORNEYS

July 8, 1941.  H. M. STROBEL  2,248,727
SIGNALING SYSTEM
Filed Dec. 9, 1939  3 Sheets-Sheet 3

INVENTOR
HOWARD M. STROBEL
BY
Marshall & Hawley.
ATTORNEYS

Patented July 8, 1941

2,248,727

UNITED STATES PATENT OFFICE 2,248,727

SIGNALING SYSTEM

Howard M. Strobel, Allegany, N. Y.

Application December 9, 1939, Serial No. 308,338

7 Claims. (Cl. 250—2)

This invention relates to signaling systems, and particularly to a system employing radiation of known wave length as the means by which intelligence is transferred from one station to another.

The object of the invention is to provide improved apparatus and method for determining at a first or primary station, the distance of a second or secondary station from the primary station. Another object is to make such determinations with any desired degree of precision; and a third object is to make them with great rapidity.

It is known to measure distances, for example the distance of an airplane above the ground, by transmitting an electromagnetic wave to the ground, where it is reflected back to its source, the airplane, receiving it again at the airplane and measuring the total elapsed transmission time. In view of the constancy of the velocity of propagation of electromagnetic radiation, the time elapsed between the transmission and the reception is a measure of the distance from the airplane to the ground.

This system does not lend itself to the measurement of great distances, particularly horizontal distances of ships at sea for example. The attenuation of the wave over its transmission path to the reflector and back, is so great in the case of large distances that when the signal is finally received after reflection it may be immeasurably weak. Furthermore, the results depend intimately upon the size and shape of the reflector, which is adequate in the case of the ground, acting as a reflector for an airplane, but inadequate in the case of a ship at sea. In addition, radio waves are more severely attenuated when travelling horizontally than when travelling vertically.

Subsidiary objects of the invention are to overcome the above-named difficulties.

I accomplish these and other objects by transmitting from the first or primary station, termed "station A" a signal of precisely known frequency and phase in the form of an electromagnetic wave; by receiving this signal at a secondary station, termed "station B," and there amplifying and retransmitting it, unaltered in frequency or phase; and lastly by receiving this retransmitted signal at the primary station and comparing its phase as finally received with its phase as originally transmitted. I am able to translate the result of this comparison into a determination of the distance separating the secondary station from the primary station in a manner which will be clear from what follows, with any desired degree of accuracy and with great speed.

In order the better to transmit my signal wave from the primary station, I prefer to modulate it onto a high frequency carrier which, as is well known, may be propagated for great distances. At the secondary station this modulated carrier is received and demodulated to provide the signal wave. The latter is then amplified and modulated onto another carrier which is transmitted from the secondary station to the primary station. At the primary station this new modulated carrier is received and demodulated to give once more the signal wave. Thus the carrier wave and the detection apparatus are of assistance in the propagation of the signal but do not constitute essential features of the measurement system.

When a carrier is employed I prefer to choose the frequency of the carrier transmitted from the secondary station different from the frequency of the carrier transmitted from the primary station. This choice of different frequencies greatly simplifies my apparatus since, if they were the same, it would be necessary to exercise the greatest precautions to prevent each station from receiving the carrier transmitted by itself, thus masking the weaker carrier received from the distant station.

More particularly, the invention consists in the system and method hereinafter described, illustrated in the accompanying drawings and defined in the claims hereto appended, it being understood that various changes in form, arrangement and details both of circuits and of method within the scope of the claims may be resorted to without departing from the spirit or sacrificing any of the advantages of the invention.

For a clearer comprehension of the invention reference is directed to the accompanying drawings which illustrate a preferred embodiment thereof, wherein.

Figure 1:
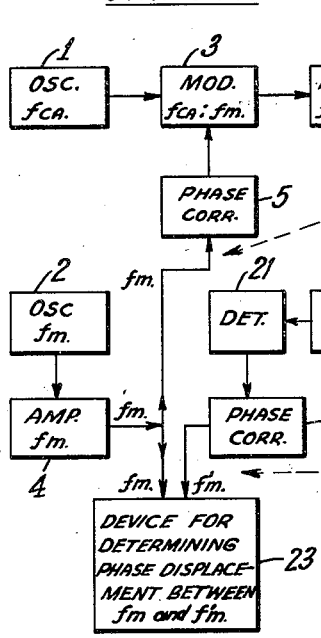
Fig. 1 is a block diagram of a prefered embodiment of my system, showing the component devices at the primary station (station A), including a phase displacement measuring device, and the component devices at the secondary station (station B)
Figure 1:
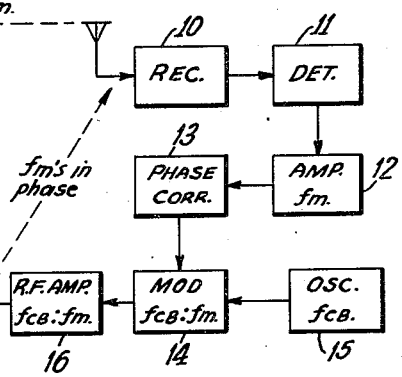

The system of my invention and the manner in which it operates will be best understood from a consideration of the block diagram, Fig. 1. At station A an oscillator 1 generates a high frequency carrier designated by the symbol "$f_{ca}$"; and another oscillator 2 generates the modulating signal designated by "$f_m$." The carrier $f_{ca}$ is fed directly to a modulator 3 and the signal $f_m$ is fed to the same modulator 3 through an amplifier 4 and a phase correcting device 5. The modulator 3 combines the modulating signal $f_m$ with the carrier in the well known manner and the resultant compound wave is fed to a radio frequency amplifier 6 for amplification. It is then transmitted to station B, the transmission path being indicated by a dashed line connecting station A with station B and the modulated signal transmitted over this path is indicated by the symbol "$f_{ca}:f_m$."

Any desired form of modulation may be utilized, since the carrier, $f_{ca}$ is employed only to carry the modulating signal $f_m$ from station A to station B, the invention residing in the treatment of the modulating signal $f_m$ and in the modulation thereof onto any appropriate carrier.

At station B the compound wave $f_{ca}:f_m$ is received in a receiver 10 and demodulated by a detector 11 to obtain the original signal $f_m$. This signal $f_m$ is next increased in strength by an amplifier 12 and then passed through a phase correcting device 13 to the station B modulator 14 into which is also fed a high frequency carrier designated by the symbol "$f_{cb}$" generated by an oscillator 15 at station B. In the modulator 14 the signal $f_m$ is modulated onto the carrier $f_{cb}$ and the resultant is amplified by an amplifier 16 and transmitted in the form of a compound wave, conveniently designated as "$f_{cb}:f_m$."

This new compound wave, $f_{cb}:f_m$ is received by a receiver 20 at station A and demodulated by a detector 21 to obtain the original signal $f_m$, which is then passed through a phase correcting device 22. This original signal, although its frequency has not been changed, will have undergone a substantial phase shift. It is therefore designated, for convenience, by the symbol "$f_m^1$" to distinguish it from $f_m$, by which it was originally designated.

This received signal $f_m^1$, is now fed to a phase displacement determining device 23 and the signal $f_m$ as originally generated at station A by the oscillator 2 is fed to the same phase displacement determining device 23 at the same time. This device 23 may be of any kind which serves the desired purpose, namely of determining the phase displacement between $f_m$ and $f_m^1$.

This phase displacement depends on a number of things: the modulating, amplifying and transmitting apparatus of station A; the distance of transmission between station A and station B; the receiving, demodulating, modulating and transmitting apparatus at station B; and the receiving and demodulating apparatus at station A. However, this effect on phase of each part of the apparatus may be discovered and corrected. It is for this purpose that the three phase correction devices 5, 13, 22, each of which is known per se, are included in the system. The first, 5, adjusts to zero the phase displacement between the signal as originally generated and as ultimately transmitted with the carrier $f_{ca}$ from station A. The second, 13, at station B, adjusts to zero the sum of all the phase displacements in the apparatus of station B so that the signal as ultimately retransmitted from station B is in phase with the signal as originally received at station B. The third, 22, adjusts to zero the phase displacement between the signal as initially received at station A and as fed, designated as $f_m^1$, to the phase displacement device 23.

When all the phase displacements due to the apparatus are corrected to zero the remaining phase displacement between $f_m$ and $f_m^1$, which may be designated as the "propagation phase displacement," depends solely on the total distance of transmission from station A to station B and return, and therefore provides an indication of this distance. For example, if the propagation phase displacement is just 180°, it is known that the distance of transmission is just one-half of the wave length corresponding to the frequency $f_m$ and therefore that the distance of separation of stations A and B is just one-quarter of this wave length.

It will be apparent that the phase correcting devices 5, 13, 22 are conveniences in the system rather than essentials. When the phase displacements in the apparatus are corrected to zero the ultimate phase displacement between $f_m$ and $f_m^1$ gives the distance of separation of the stations directly without the necessity of corrections; but if desired, the phase correcting devices 5, 13, 22 may be dispensed with and instead, the phase displacement due to both transmissions may be determined by subtracting from the total phase displacement the phase displacements due to the apparatus, which in this case must of course be precisely known.

Figure 2:
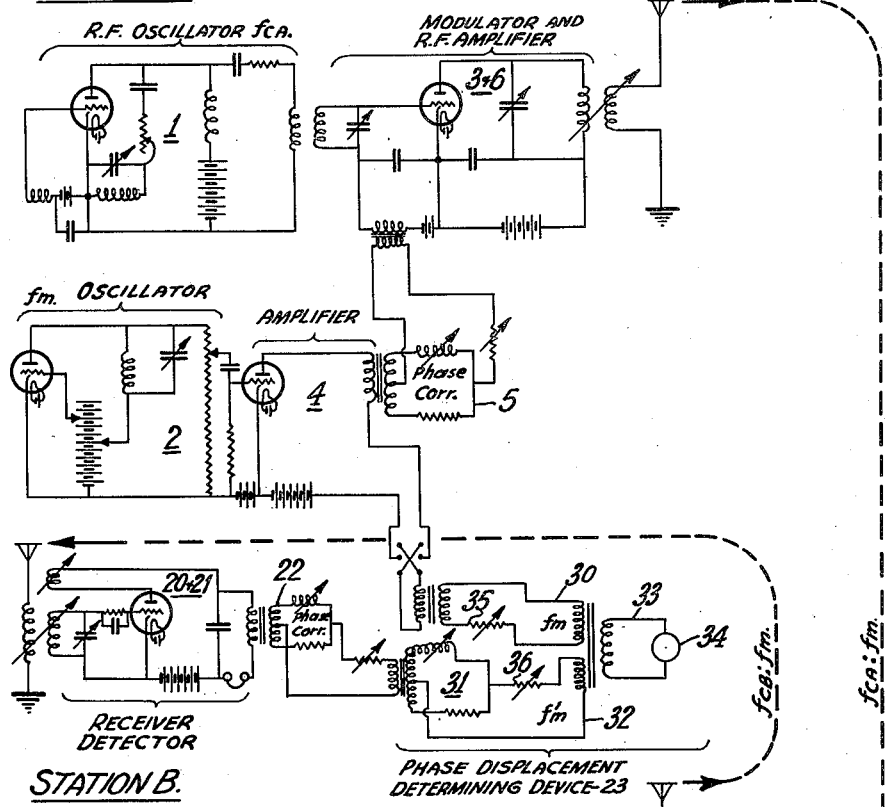
Fig. 2 shows the essential circuit elements and details of the system schematically shown in Fig. 1.
Figure 2:
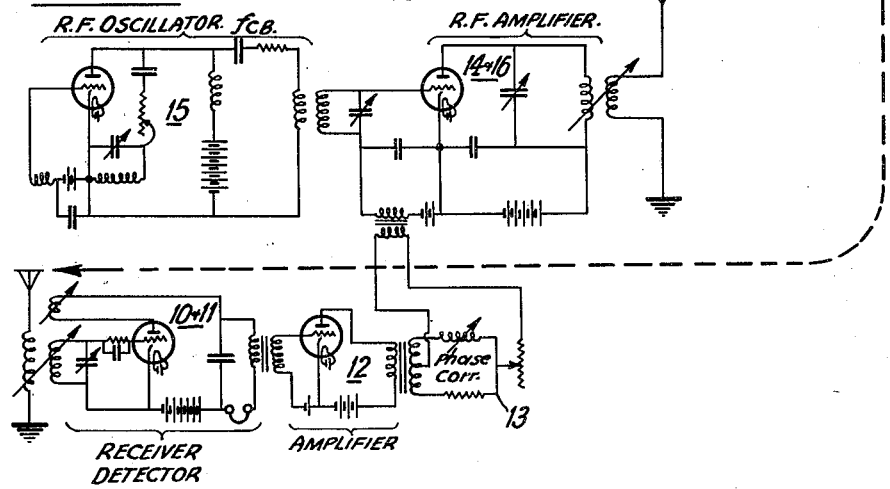

Fig. 2 is a wiring diagram of preferred circuit arrangements for the system of my invention. The various devices at stations A and B are numbered and labelled correspondingly with the blocks of Fig. 1, except that a single device is shown as performing the functions of modulation and R. F. amplification in both stations and another single device is shown as performing the functions of receiving and detecting in both stations. The various component parts such as vacuum tubes, condensers, inductances, batteries, resistors and the like are indicated by conventional symbols. The transmission paths from station A to station B and the return path from station B to station A are indicated by the heavy dashed lines.

Fig. 2 shows the details of a simple phase displacement measuring device 23. It includes a transformer having three windings, two input windings and one output winding. The signal $f_m$ is supplied directly to one of the input windings 30, 32 and the signal $f_m^1$ is supplied through a calibrated phase shifter 31 to the other winding 32. The output winding 33 is connected to a meter 34 which may be of any appropriate type. In operation the phase shifter 31 is manually adjusted until the meter reading is zero, indicating that the voltages in the two primary windings 30, 32 are opposed; or a maximum, indicating that these voltages are aiding. The dial of the phase shifter 31 which may conveniently be calibrated in fractions of a wave length, is then read. When the frequency and wave length of $f_m$ are known, the distance of separation of the stations may at once be computed.

In order that there may be precision in the results it is essential that the frequency $f_m$ be constant and be accurately known. Devices such as the crystal-controlled oscillator for holding the frequency of oscillation to a constant value are well known in the art.

In actual practice, the minimum deflection of the meter is sharper than the maximum, and I therefore prefer to shift the phase of $f_m^1$ until minimum meter deflection is obtained. Of course, in order that there shall be any minimum the voltages on the two primary windings should be alike in magnitude and any desired means may be employed to accomplish this result. I have shown as one such means a variable resistance 35, 36 in series with each winding 30, 32.

As above stated, a phase shift of 180° corresponds to a total transmission distance of one-half wave length. Similarly a phase displacement of 360° corresponds to a total transmission distance of a full wave length or a separation distance between stations of one-half wave length. Greater distances of separation will correspond to phase displacements of more than 360°, which in the case of known phase measuring devices are indistinguishable from phase shifts of lesser amounts; for example a phase shift of 400° is indistinguishable from a phase shift of 40°. Thus a unique determination of distances is obtainable only for station separations up to one half the wave length.

As an illustration, suppose that a modulation frequency of 1500 C. P. S. is chosen, corresponding to a wave length of 200 km. The same amount of phase shift would be obtained for a number of stations B, each separated from the next by a half wave length or 100 km. Suppose that the phase shift indication is 180°. This means that the station separation distance may be any one of the fractions ¼, ¾, 5/4, 7/4 etc. of the wave length and unless the distance be approximately known, the measurement is substantially useless.

The distance may be approximately known by the simple expedient of using a lower modulation frequency. For example, if a frequency of 150 C. P. S. be used, the full wave length is 2000 km. and distances up to one-half of this or 1000 km. can be measured before phase displacement values begin to repeat. If for example, station B is 970 km. distant from station A the phase shift reading on the low frequency of 150 C. P. S. will be about 349°. Greater precision of measurement may now be obtained by changing the frequency of $f_m$, for example to a frequency 10 times as high, 1500 C. P. S., whereupon the full transmission path will be 9 full wave lengths and 7/10 of a wave length, and the phase shift reading will be 252°, with a precision 10 times as great as that given by the low frequency measurement.

Similarly, still greater precision may be obtained by using a still higher frequency, for example, 15,000 C. P. S., corresponding to a full wave length of 20 km. or a separation distance of 10 km. or less.

Figure 3:
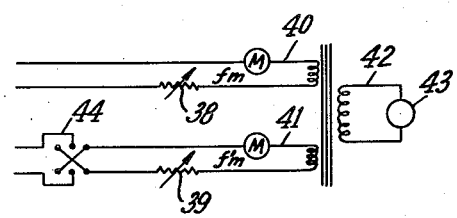
Fig. 3 is a circuit diagram illustrating an alternative arrangement of phase displacement measuring apparatus.

The above-described apparatus is simple and the method of utilizing it to make measurements of distance is precise. However, when station B is a moving object such as a ship at sea whose distance it is important to know at all times, it may be desirable to have a continuous indication of such distance. This may be accomplished by a slight alteration in the above-described apparatus illustrated in Fig. 3. In this figure the signals $f_m$ and $f_m^1$ are adjusted to equal standard magnitudes by resistors 38, 39 and are then impressed on two input windings 40, 41, of a transformer without the interposition of any phase shifting device, and an output winding 42 feeds a meter 43 which is directly calibrated in fractions of a wave length for this standard. A station separation distance of ¼ wave length corresponds as above described to a phase displacement of 180° and therefore to a meter reading of zero as indicated on the diagram Fig. 4. Any less separation distance corresponds to a less phase displacement and therefore to a positive meter reading, until at distances so short that they correspond to an insubstantial fraction of a wave length, the meter deflects to substantially its full scale reading.

Figure 4:
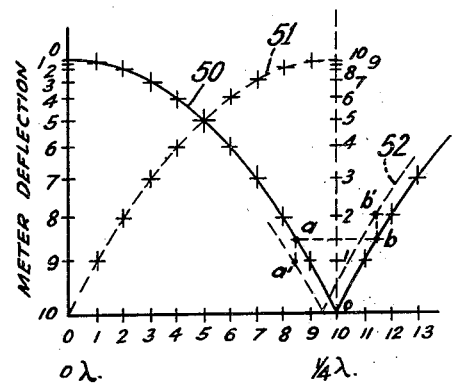
Fig. 4 is a diagram illustrating the mode in which phase indications of the apparatus of Fig. 3 are interpreted as measurements of the distance of separation of stations A and B.

As shown by the solid curve 50, and the left hand ordinate scale, Fig. 4, the precision is greatest for distances in the neighborhood of ¼ wave length and least at very small fractions of a wave length. For example, a distance of 0.8 of a quarter wave length may be measured with far more accuracy than a distance of 0.2 of the same quarter wave length. To overcome this objection I simply provide a reversing switch 44 (Fig. 3) in the circuit of $f_m^1$. It might be provided in the circuit of $f_m$ equally well. When this switch 44 is thrown, the dashed curve 51 of Fig. 4, and the right hand dashed ordinate scale are substituted for the solid curve 50 and the precision conditions reversed, so that now the smaller distances may be measured precisely.

When the meter reading is in the neighborhood of zero it may be that the operator will not know whether it corresponds to the point $a$ or to the point $b$ on the solid curve 50 of Fig. 4. He may easily discover this by slightly shifting the frequency $f_m$. If for example he makes a frequency shift which corresponds to a decrease in wave length of 5% the effect on the meter readings will be as indicated by the dotted line 52 in Fig. 4. If the reading was at $a$, the new reading will be less. If it was at $b$, the new reading will be greater.

As before, particularly in the case of great distances, greater precision may be obtained by using a higher signal frequency, for example a frequency 10 times as high. For example, choosing 75 C. P. S. as the signal frequency, the wave length is 4000 km. and zero deflection of the meter corresponds to a separation distance of a quarter wave length or 1000 km. With 10 divisions on the dial, each division represents 100 km. Then, if for example, the meter reads some value between 3 and 4 the operator would know that the separation distance between stations was between 300 and 400 km. He could then raise the signal frequency to 750 C. P. S., for example, giving a measuring unit of 100 km., whereupon each of the 10 divisions will represent 10 km. and the full range of the meter scale would apply to the region between 300 and 400 km. separation, thus giving 10 times the precision of the earlier measurement.

Figure 5:
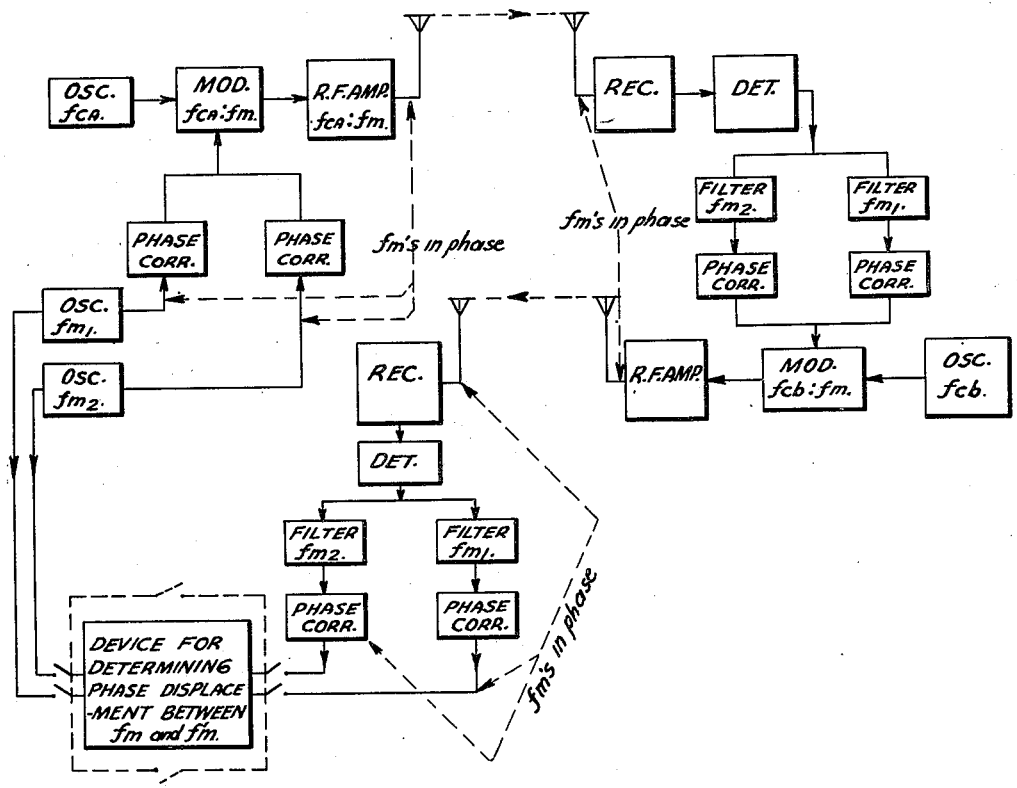
Fig. 5 is a block diagram similar to that of Fig. 1, but showing a modified system adapted for simultaneous transmission and reception of a plurality of signals.
Figure 6:
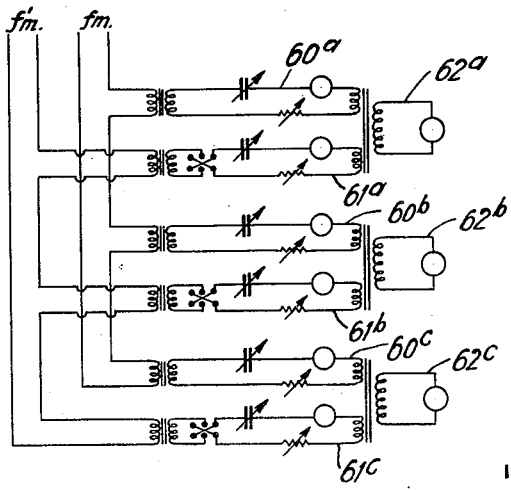
Fig. 6 is a modification of the circuit diagram of Fig. 3, appropriate for use with the modified system of Fig. 5.

For continuous indications which may be interpreted with the greatest rapidity it may be desirable to make the low frequency reading and the high frequency reading simultaneously. This may be accomplished, as indicated in Fig. 5, by simultaneously generating at station A two or more signals of accurately known frequency, for example 75 C. P. S., 750 C. P. S. and 7500 C. P. S. These may then be modulated together on the carrier $f_{ca}$, transmitted to station B, returned by station B and received and demodulated at station A and fed to the phase displacement measuring device, all in the same manner as one. They must eventually be separated, and a convenient manner of accomplishing this separation is illustrated in Fig. 6, where three pairs of tuned circuits 60, 61 are shown, each operating its own meter 62. Both members of one pair are of course tuned to one signal frequency, for example, 75 C. P. S., both members of the second pair to another signal frequency, for example, 750 C. P. S., and both members of the third pair to still another, for example, 7500 C. P. S. Tuned circuits and meters may be duplicated as much as desired.

It is of course necessary in the case of the simultaneous transmission of two or more modulating frequencies that each of them be properly corrected for phase at the station A transmitter, at station B, and at the station A receiver. In case any of this apparatus is of a character to cause different phase shifts in the different signal frequencies, separate phase corrections must be applied. This can be done in a well known manner by separating the components through filters and passing them through separate phase correction devices and ultimately recombining them. This separation and recombination are likewise indicated in Fig. 5.

Though I conceive that my system will have its chief utility in determining the distance between ships at sea or between a ship and the shore it is, of course, not limited to this use but may be of utility in determining the distance of an airplane from a landing field, or its altitude, or both. Obviously it may, if desired, easily be applied to determining the distance between fixed points on land. Furthermore the wireless link is not an essential. Any form of wave propagation will serve, as long as the velocity of propagation is definitely known.

Due to variations in the medium through which a wave might be propagated, the velocity of the wave propagation may not be a definite known constant. In the case of radio waves propagated through air, for example, variations in air pressure humidity and ionization may alter the velocity of propagation, and hence likewise any distance measurement premised thereon. A distance measuring primary station may be corrected for such errors by using an auxiliary secondary station located some measured fixed distance from the primary station. Using carrier frequencies that will not interfere with the main working frequencies of the primary station, the measured distance off of the auxiliary secondary station from the primary station can be used to monitor the modulating frequency of the primary station oscillator. Monitoring may be accomplished in one of two ways: One is by varying the modulating frequency of the oscillator until the indicating meter (which is, say, calibrated in units of distance) also indicates the correct known distance, and the second way is to maintain the modulating frequency constant and use the value given by the indicating meter (which will be in error when changes in the velocity of the propagated wave occur) to determine the correction factor that must be applied to any indicated readings. In this way, when the primary station takes a distance measurement on some mobile station an unknown distance away, assuming that the atmospheric conditions are the same throughout the length of path as exist at the primary station, then the modulating frequency or correction factor determined by the use of the auxiliary secondary station can be used to correct the indicated distance measurement.

It will be plain to those skilled in the art that my invention can equally be applied to the determination of propagation velocity when distance and frequency are known, or to the determination of frequency when distance and velocity are known.

I claim:

1. The method of measuring distance which comprises simultaneously transmitting a plurality of signals of preassigned constant frequency from a primary station, said signals differing in frequency by successive multiples of ten of the lowest fundamental signal frequency of the group, receiving said signals at a secondary station, amplifying and retransmitting said signals from said secondary station, receiving said signals at said primary station, adjusting to known values all phase displacements of each of said signals due to translation of said signals through apparatus, determining the total phase displacement between each of said signals as originally transmitted from said primary station and as ultimately received thereat, and determining the propagation phase displacement for each of said signals by subtracting from said total phase displacement determination said apparatus phase displacements.

2. The method of measuring distance which comprises modulating a carrier with a plurality of signals each of preassigned constant frequency, at a primary station, to provide a compound wave, said signals differing in frequency by successive multiples of ten of the lowest fundamental signal frequency of the group, transmitting said compound wave to a secondary station, receiving and demodulating said compound wave at said secondary station to obtain said signals, modulating another carrier with said signals to provide another compound wave and transmitting said other compound wave to the primary station, receiving and demodulating said other compound wave at said primary station to obtain said signals, adjusting to known values all phase displacements of each of said signals due to translation of said signals through apparatus, determining the phase displacement between said signals as initially transmitted from said primary station and as finally received thereat and determining the propagation phase displacement of each of said signals by subtracting from said total phase displacement determination said apparatus phase displacements.

3. In a distance measuring system, the combination of means at a primary station for generating a plurality of signals of preassigned constant frequency, said signals differing in frequency by successive multiples of ten of the lowest fundamental signal frequency of the group, means at said primary station for transmitting said signals with a first carrier to a secondary station, means at said secondary station for receiving said carrier and signals and retransmitting the signals with a second carrier to the primary station, said second carrier differing from said first carrier, means at the primary station for receiving said second carrier and signals and for separating said signals from said second carrier, means for adjusting to known values phase shifts of each of said signals due to translation of said signals through apparatus, and means at the primary station for determining the propagation phase displacement between each of the signals as originally transmitted and as ultimately received.

4. In a distance measuring system, the combination of means at a primary station for generating a plurality of signals of preassigned constant frequency, said signals differing in frequency by successive multiples of ten of the lowest fundamental signal frequency of the group, means at said primary station for transmitting said signals with a first carrier to a secondary station, means at said secondary station for receiving said carrier and signals and retransmitting the signals with a second carrier to the primary station without alteration of frequency or phase of any of said signals, said second carrier differing from said first carrier, means at the primary station for receiving said second carrier and signals and for separating said signals from said second carrier, and means at the primary station for determining the phase displacement in decimal parts of a wave length unit between each of said signals as originally transmitted and as ultimately received.

5. The method of determining the velocity of a wave in terms of a constant frequency and a known constant length of path which comprises transmitting a signal of preassigned frequency and phase from a primary station, receiving said signal at a secondary station, said secondary station being a known constant distance from said primary station, retransmitting said signal from said secondary station, receiving the retransmitted signal at said primary station, adjusting to known values all phase displacements of said signal due to translation of said signal through apparatus, determining the total phase displacement between the signal as originally transmitted from said primary station and as ultimately received thereat, and from the difference of said total phase displacement and said apparatus phase displacements determining the propagation phase displacement.

6. In a signaling system for determining the velocity of a wave in terms of a signal wave having a known constant frequency and traversing a known constant length of path, the combination of means at a primary station for generating a signal of preassigned frequency and phase, means at said primary station for transmitting said signal with a first carrier to a secondary station, the distance between said primary and said secondary station being a known and fixed value, means at the secondary station for receiving said carrier and signal and for retransmitting the signal with a second carrier to the primary station, means at the primary station for receiving said second carrier and retransmitted signal and for separating said signal from said second carrier, with means at each of said stations for adjusting to known values any apparatus phase shift introduced into said signal due to any of said translating apparatus, and means at the primary station for determining the propagation phase displacement between the signal as originally transmitted and as ultimately received.

7. In a signaling system for indicating the distance between a primary and a secondary station in decimal parts of a fundamental wave length simultaneously to at least two significant figures, the combination of means at a primary station for generating simultaneously a plurality of signals of preassigned constant frequency and phase, said plurality of signals differing in frequency by successive multiples of ten of the lowest fundamental signal frequency of the group, means at said primary station for transmitting said signals with a first carrier to a secondary station, means at said secondary station for receiving said carrier and signals and retransmitting the signals with a second carrier to the primary station, means at the primary station for receiving said second carrier and retransmitted signals and for separating said signals from said second carrier, means for adjusting to known values, phase shifts of said signals due to translation of said signals through apparatus at said stations, and means at the primary station for simultaneously indicating the propagation phase displacement in decimal parts of a wave length unit between each of the signals as originally transmitted and as ultimately received.

HOWARD M. STROBEL.